(12) United States Patent
Chiu

(10) Patent No.: US 8,710,684 B2
(45) Date of Patent: Apr. 29, 2014

(54) APPARATUS FOR GENERATING ELECTRICAL ENERGY FROM ROCKING ACTIVATED ENERGY

(75) Inventor: Ming-Chin Chiu, Changhua (TW)

(73) Assignee: China Green Energy Co., Ltd., Xihu Township (TW)

( * ) Notice: Subject to any disclaimer, the term of this patent is extended or adjusted under 35 U.S.C. 154(b) by 169 days.

(21) Appl. No.: 13/538,689

(22) Filed: Jun. 29, 2012

(65) Prior Publication Data

US 2013/0009407 A1    Jan. 10, 2013

(30) Foreign Application Priority Data

Jul. 4, 2011    (TW) .............................. 100123496 A

(51) Int. Cl.
*F03G 7/08*    (2006.01)
(52) U.S. Cl.
USPC .......................................... 290/1 C; 290/1 R
(58) Field of Classification Search
USPC .................................. 290/1 C, 1 R
See application file for complete search history.

(56) References Cited

U.S. PATENT DOCUMENTS

| 4,418,542 | A  | * | 12/1983 | Ferrell | ........................... 60/668 |
| 6,353,270 | B1 | * | 3/2002 | Sen | .............................. 290/1 R |
| 2002/0089309 | A1 | * | 7/2002 | Kenney | ............................. 322/1 |
| 2010/0237631 | A1 | * | 9/2010 | Yu | ................................. 290/1 R |
| 2011/0089703 | A1 | * | 4/2011 | Kennedy | ....................... 290/1 C |
| 2012/0025543 | A1 | * | 2/2012 | Gilbert, Jr. | .................... 290/1 C |
| 2012/0211996 | A1 | * | 8/2012 | Jang | ............................. 290/1 R |

* cited by examiner

*Primary Examiner* — Tulsidas C Patel
*Assistant Examiner* — Sean Gugger
(74) *Attorney, Agent, or Firm* — Marger, Johnson & McCollom, P.C.

(57) ABSTRACT

An apparatus includes an unbalanced mass unit configured to be rockable between front and rear unbalanced positions by virtue of the moment of inertia, a coupling shaft which rotatably extends through an upper segment of the unbalanced mass unit and which is coupled with an electricity generator, and a releasably retaining member releasably retaining the unbalanced mass unit at the rear unbalanced position. In response to a downward mechanical load, the releasably retaining member releases the unbalanced mass unit to allow the unbalanced mass unit to commence rocking so as to permit the coupling shaft to generate a rotating torque for conversion into electricity by the electricity generator.

10 Claims, 8 Drawing Sheets

US 8,710,684 B2

APPARATUS FOR GENERATING ELECTRICAL ENERGY FROM ROCKING ACTIVATED ENERGY

CROSS-REFERENCE TO RELATED APPLICATION

This application claims priority of Taiwanese Patent Application No. 100123496, filed on Jul. 4, 2011, the disclosure of which is herein incorporated by reference.

BACKGROUND OF THE INVENTION

1. Field of the Invention

This invention relates to an apparatus for generating electrical energy, more particularly to an apparatus for generating electrical energy from rocking activated energy.

2. Description of the Related Art

Due to depletion of natural resources, there is a growing demand for renewable resources of energy. In the area of electric power generation, the development of hydropower and wind power is a major concern. However, there are geographical constraints for power generation utilizing water movement or winds. It is therefore desirable to utilize energy generated by movements or actions that are performed in everyday life for power generation.

SUMMARY OF THE INVENTION

An object of the present invention is to provide an apparatus which can be caused to generate electrical energy from rocking activated energy by a stroke of downward action, such as downward force exerted by wheels of a vehicle running over a road surface.

According to this invention, the apparatus for generating electrical energy includes an unbalanced mass unit which is disposed to be rockable along a wobbling path, and which includes an upper segment and a lower segment. The lower segment has a juncture region which is proximate to the upper segment, and which has front and rear marginal zones, and a center-of-mass region which is distal from the upper segment and which defines the center of mass of the unbalanced mass unit. The lower segment is angularly movable along the wobbling path between front and rear unbalanced positions, where the front and rear marginal zones respectively reach highest front and rear points by virtue of the moment of inertia. The upper segment makes a forward rocking movement from the front unbalanced position to the rear unbalanced position, and a rearward rocking movement from the rear unbalanced position to the front unbalanced position. A coupling shaft extends along a rotary axis, and is coupled to the upper segment. A weighting unit is connected to the coupling shaft, and is swung in response to at least one of the forward and rearward rocking movements of the upper segment to permit the coupling shaft to make a rotational movement about the rotary axis. An electricity generator is disposed to be movable with the unbalanced mass unit, and is coupled with the coupling shaft to convert the rotational movement into electrical energy. A releasably retaining member is disposed in proximity to one of the front and rear unbalanced positions, and has a retaining end. When the lower segment reaches a corresponding one of the front and rear unbalanced positions, the retaining end is releasably snapped on a corresponding one of the front and rear marginal zones so as to retain the lower segment at the corresponding one of the front and rear unbalanced positions. A triggering member is disposed to be actuated, in response to a downward mechanical load, to make a stroke of downward movement. A force transmitting mechanism is disposed to couple the releasably retaining member with the triggering member such that, in response to the stroke of downward movement of the triggering member, the retaining end is actuated to release the corresponding one of the front and rear marginal zones so as to permit the lower segment to commence movement along the wobbling path.

When a downward mechanical load is applied to the triggering member, through the movement of the unbalanced mass unit, the coupling shaft can be rotated so as to generate a rotational torque for conversion into electrical energy by the electricity generator.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
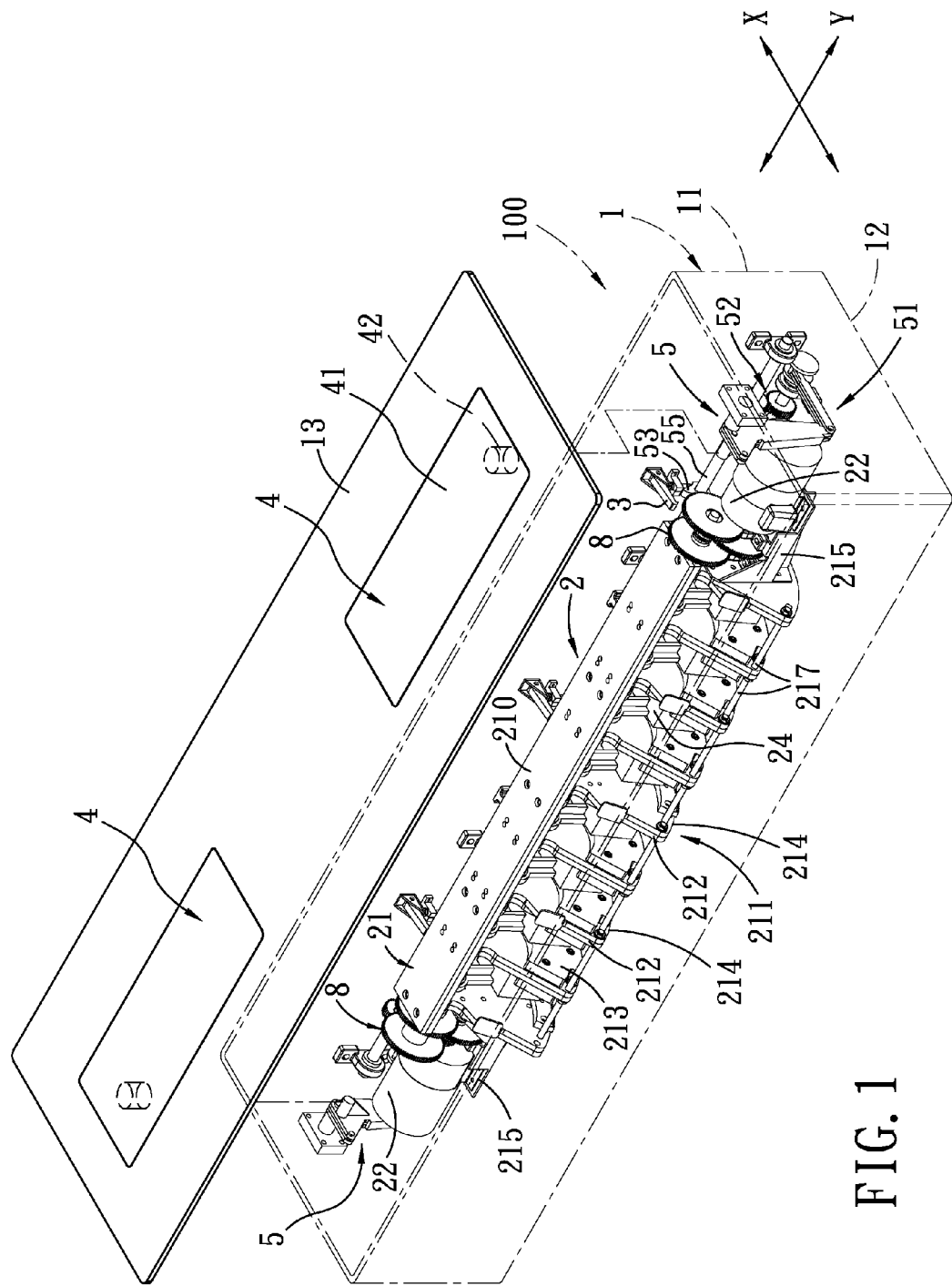
FIG. 1 is a perspective view of the preferred embodiment of an apparatus for generating electrical energy according to this invention.
Figure 2:
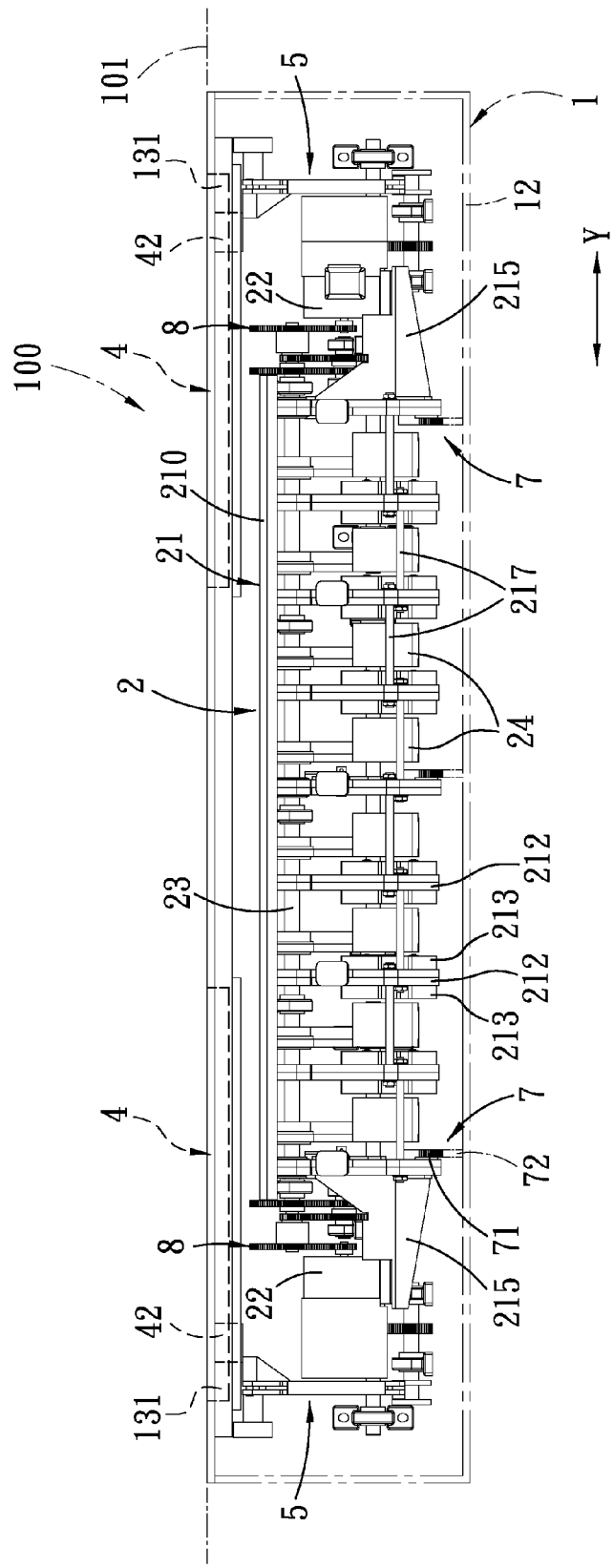
FIG. 2 is a side view of the preferred embodiment.
Figure 3:
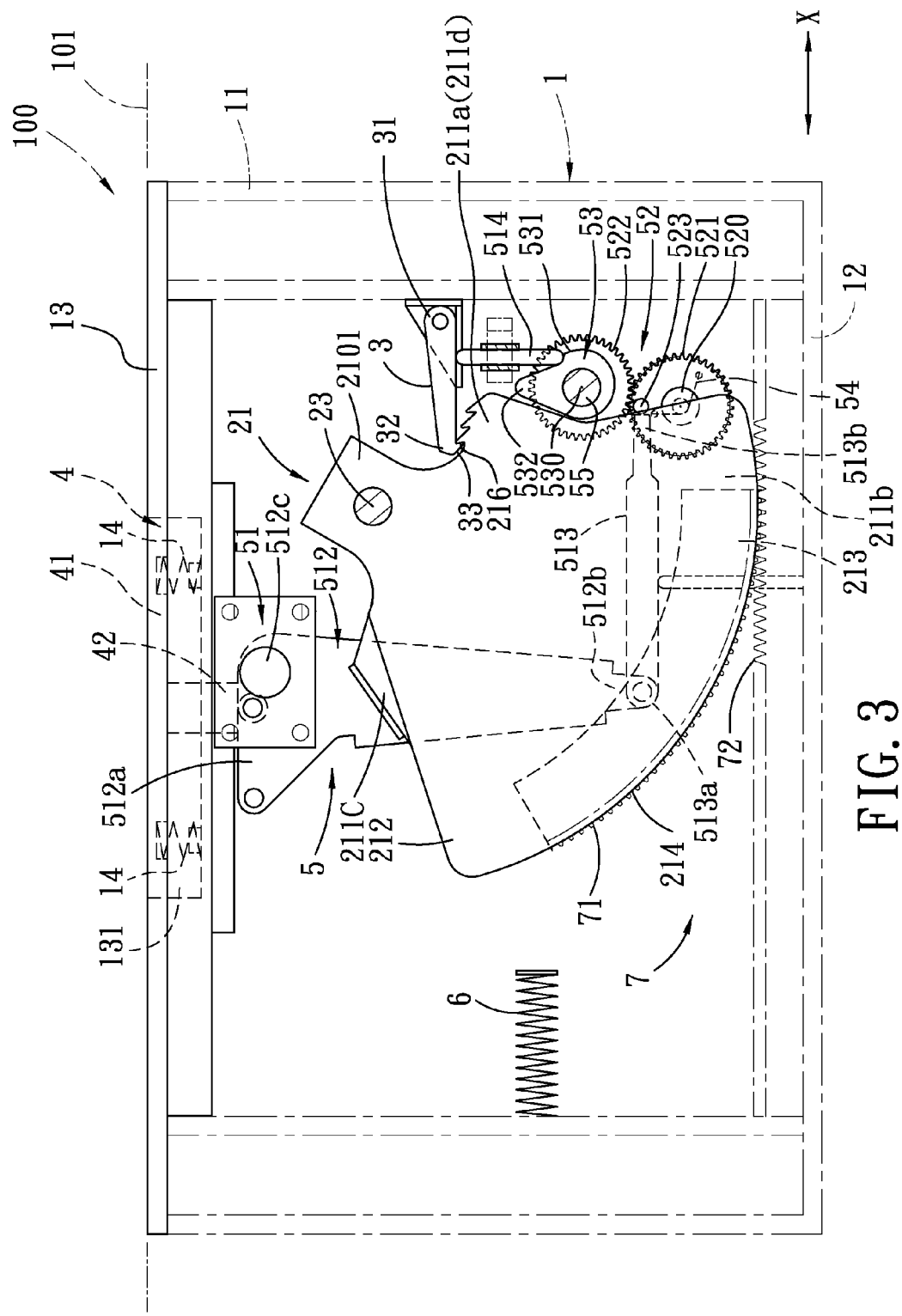
FIG. 3 is a schematic view showing an unbalanced mass unit held in a front unbalanced state.

Referring to FIGS. 1 to 3, the preferred embodiment of an apparatus 100 for generating electrical energy according to the present invention is shown to comprise a frame 1, a wobbling module 2, at least one releasably retaining member 3, a pair of triggering members 4, and a pair of force transmitting mechanisms 5.

The frame 1 is adapted to be mounted under a road surface 101, and includes upper and lower walls 13, 12 spaced apart from each other in an upright direction, and a surrounding wall 11 extending between the upper and lower walls 13, 12 and cooperating with the upper and lower walls 13, 12 to define an accommodation space. The upper wall 13 may be disposed flush with the road surface 101, and has a pair of concavities 131. Each of the triggering members 4 includes a platform 41 having a spring 14 loaded therein and movably disposed in the respective concavity 131, and an actuating block 42 extending downwardly into the accommodation space. The platform 41 is configured to be movably fitted in the respective concavity 131, and is actuated to make a stroke of downward movement in response to a downward mechanical load, such as a vehicle running over the road surface 101.

The wobbling module 2 is received in the accommodation space, and includes an unbalanced mass unit 21, a pair of electricity generators 22, a coupling shaft 23, and a weighting unit 24.

Figure 5:
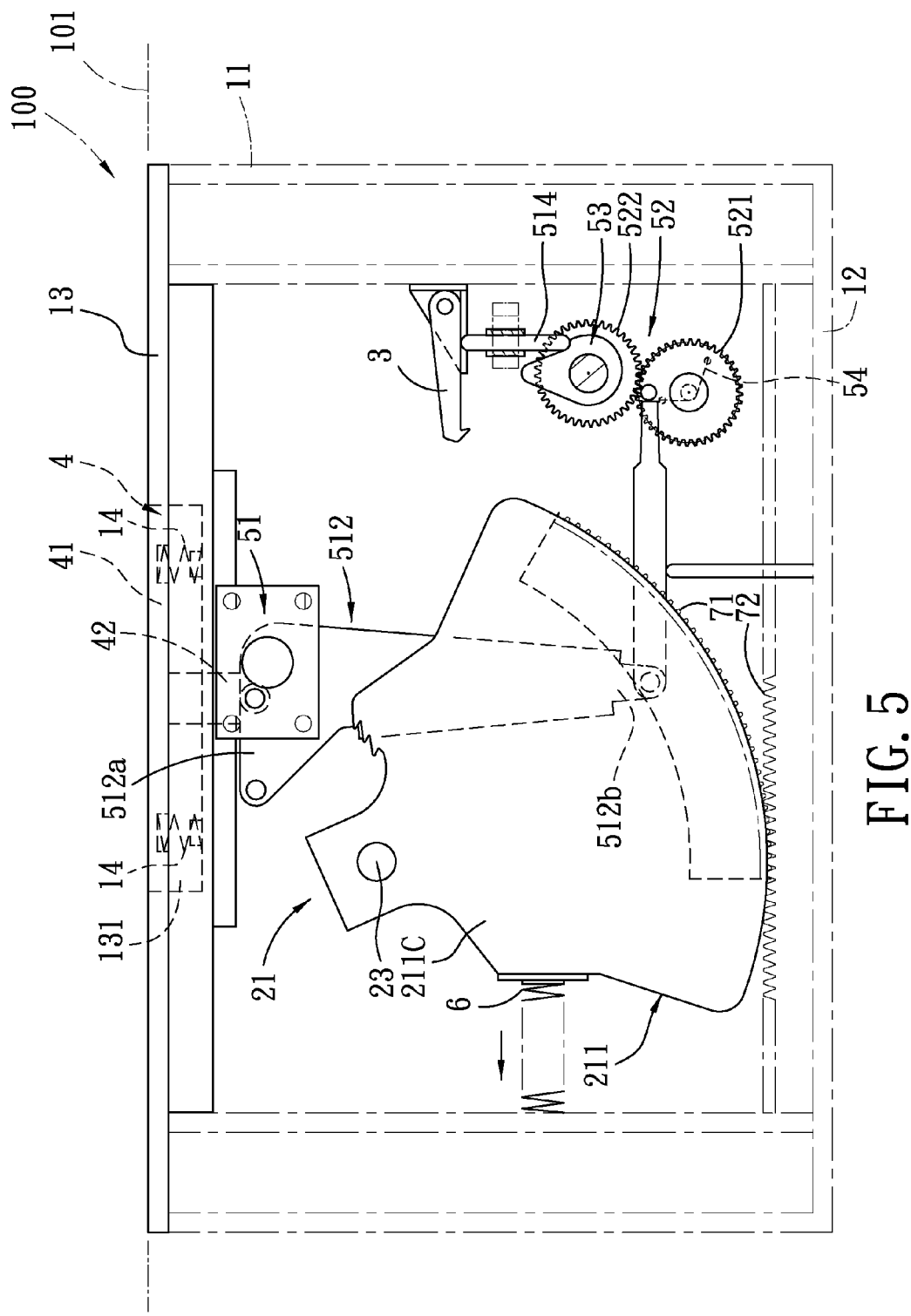

The unbalanced mass unit 21 is disposed to be rockable relative to the lower wall 12 along a wobbling path that extends in a forward and rearward direction (X). The unbalanced mass unit 21 includes an upper segment 210 having a rocking region 2101, and a lower segment 211 disposed opposite to the upper segment 210 in the upright direction. The lower segment 211 has a juncture region (211*a*) which is proximate to the upper segment 210, and which extends in the forward and rearward direction (X) to terminate at front and rear marginal zones (211*c*, 211*d*), and a center-of-mass region (211*b*) which is distal from the upper segment 210, and which defines the center of mass of the unbalanced mass unit 21. Specifically, the unbalanced mass unit 21 has an elongated slat 210 serving as the upper segment 210, a plurality of rocking plates 212 connected to the elongated slat 210 and spaced apart from one another in a longitudinal direction (Y) that is transverse to the forward and rearward direction (X) to cooperatively serve as the lower segment 211, and a plurality of interconnecting bolts 217, each interconnecting two adjacent ones of the rocking plates 212. Each of the rocking plates 212 has a rounded bottom surface 214 which angularly extends about a rotary axis in the longitudinal direction (Y). A plurality of weight blocks 213 are mounted respectively on the rocking plates 212 adjacent to the respective rounded bottom surfaces 214. Due to the center of mass that is located at the lower segment 211, and due to the rounded bottom surfaces 214, the lower segment 211 is angularly movable along the wobbling path between front and rear unbalanced positions which are opposite to each other in the forward and rearward direction (X), and where the front and rear marginal zones (211*c*, 211*d*) respectively reach highest front and rear points by virtue of the moment of inertia, as shown in FIGS. 5 and 3, respectively. Hence, the rocking region 2101 of the upper segment 210 can make a forward rocking movement from the front unbalanced position to the rear unbalanced position, and a rearward rocking movement from the rear unbalanced position to the front unbalanced position.

A pair of brackets 215 are mounted on leftmost and rightmost ones of the rocking plates 212, respectively, for supporting the electricity generators 22 so as to be movable with the unbalanced mass unit 21. The coupling shaft 23 extends through the rocking region 2101 along the rotary axis so as to be rotatable relative to the unbalanced mass unit 21. A weighting unit includes a plurality of weighting members 24, each linked to the coupling shaft 23 and configured to be swung in response to the rocking movements of the rocking region 2101 so as to rotate the coupling shaft 23 about the rotary axis. In particular, the coupling shaft 23 is rotated in a counterclockwise direction when the rocking region 2101 of the unbalanced mass unit 21 makes the forward rocking movement, and in a clockwise direction when the rocking region 2101 makes the rearward rocking movement.

The two electricity generators 22 are coupled with two ends of the coupling shaft 23 through two speed-up gearboxes 8, respectively, so as to convert rotational torques of the coupling shaft 23 into electrical energy. Particularly, a unidirectional bearing (not shown) is interposed between the coupling shaft 23 and one of the electricity generators 22 to permit the rotational torque of the coupling shaft 23 in either one of clockwise and counterclockwise directions to be transmitted to the corresponding electricity generator 22.

Referring to FIG. 3, the releasably retaining member 3 is in the form of a lever which has a pivot end 31 pivotally mounted on the surrounding wall 11 about a pivot axis in the longitudinal direction (Y), and disposed in proximity to the rear unbalanced position, a retaining end 32 having a slope guide 33, and an actuated region interposed between the retaining and pivot ends 32, 31. The retaining end 32 is configured such that, when the lower segment 211 reaches the rear unbalanced position, the retaining end 32 is releasably snapped on the rear marginal zone (211*d*) so as to retain the lower segment 211 at the rear unbalanced position.

In this embodiment, a biasing member 6, in the form of a biasing spring, is mounted on the surrounding wall 11 in proximity of the front unbalanced position, and is configured such that, when the lower segment 211 reaches the front unbalanced position, the biasing member 6 pushes the front marginal zone (211*c*) back (as shown in FIG. 5) so as to move the lower segment 211 toward the releasably retaining member 3.

Specifically, at least one of the rocking plates 212 has teeth 216 (only one rocking plate 212 is shown in FIG. 3) at the rear marginal zone (211*d*) for releasable engagement with the retaining end 32. Alternatively, the rear marginal zone (211*d*) may be formed with a hooked protrusion to permit the retaining end 32 to hook thereon. Also, a plurality of the releasably retaining members 3 and the biasing members 6 may be provided.

The force transmitting mechanisms 5 are disposed to couple the releasably retaining member 3 with the triggering members 4 such that, in response to the stroke of downward movement of the triggering members 4, the retaining end 32 of the releasably retaining member 3 is actuated to release the rear marginal zone (211*d*) so as to permit the lower segment 211 to commence movement along the wobbling path.

Figure 4:
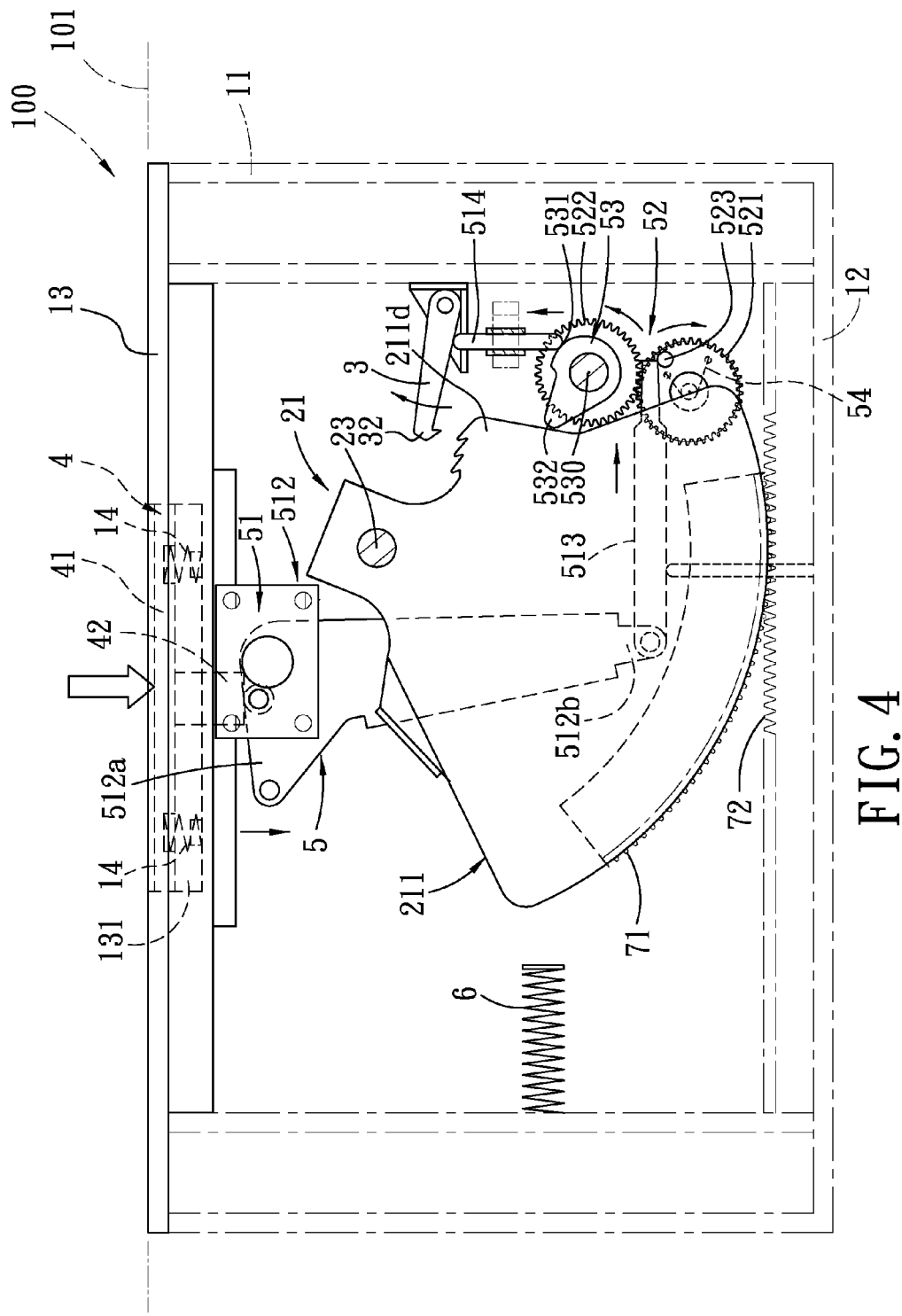
FIGS. 4 to 6 are, respectively, schematic views showing the operation of the unbalanced mass unit.

Referring to FIGS. 1, 3 and 4, in this embodiment, each of the force transmitting mechanisms 5 includes a linkage 51, a gear assembly 52, a cam member 53, and a transmitting shaft 55.

The linkage 51 includes an L-shaped first link member 512 pivotally mounted about a link axis (512*c*) parallel to a cam axis that is parallel to the pivot axis of the releasably retaining member 3. The first link member 512 has a power end (512*a*) which is connected to the actuating block 42 of the respective triggering member 4 so as to be actuated by the stroke of downward movement of the respective triggering member 4, and a weight end (512*b*) which is angularly displaced from the power end (512*a*) about the link axis so as to convert the stroke of downward movement to a rearward stroke. The linkage 51 further includes a second link member 513 having a linked end (513*a*) which is linked with the weight end (512*b*), and an actuating end (513*b*).

The gear assembly 52 includes a first gear 521 coupled with the actuating end (513*b*) of the second link member 513 through an eccentric stem 523 so as to be driven by the rearward stroke to rotate in a clockwise direction, and a second gear 522 meshed with the first gear 521 and coaxially mounted with the transmitting shaft 55 so as to be rotated with the transmitting shaft 55 in a counterclockwise direction. The transmitting shaft 55 extends along the cam axis so as to be rotated about the cam axis.

The cam member 53 is mounted on and rotated with the transmitting shaft 55 about the cam axis, and has a cam surface 531 and a pressing region 532 which are angularly displaced from each other. An actuating shaft 514 is engaged with the actuated region of the releasably retaining member 3, and is disposed to be actuated by the cam surface 531 to turn the actuated region about the pivot axis.

Referring to FIG. 4, when the triggering member 4 makes the downward stroke to permit the actuating block 42 to turn the first link member 512, the rearward stroke of the second link member 513 can rotate the transmitting shaft 530 through the gear assembly 52, and the cam surface 531 is turned about the cam axis to turn the releasably retaining member 3 through the actuating shaft 514 from a non-actuating position to an actuating position so as to permit the retaining end 32 to disengage from the rear marginal zone (211*d*). Meanwhile, the pressing region 532 is also turned to press the rear marginal zone (211*d*) toward the biasing member 6.

Figure 6:
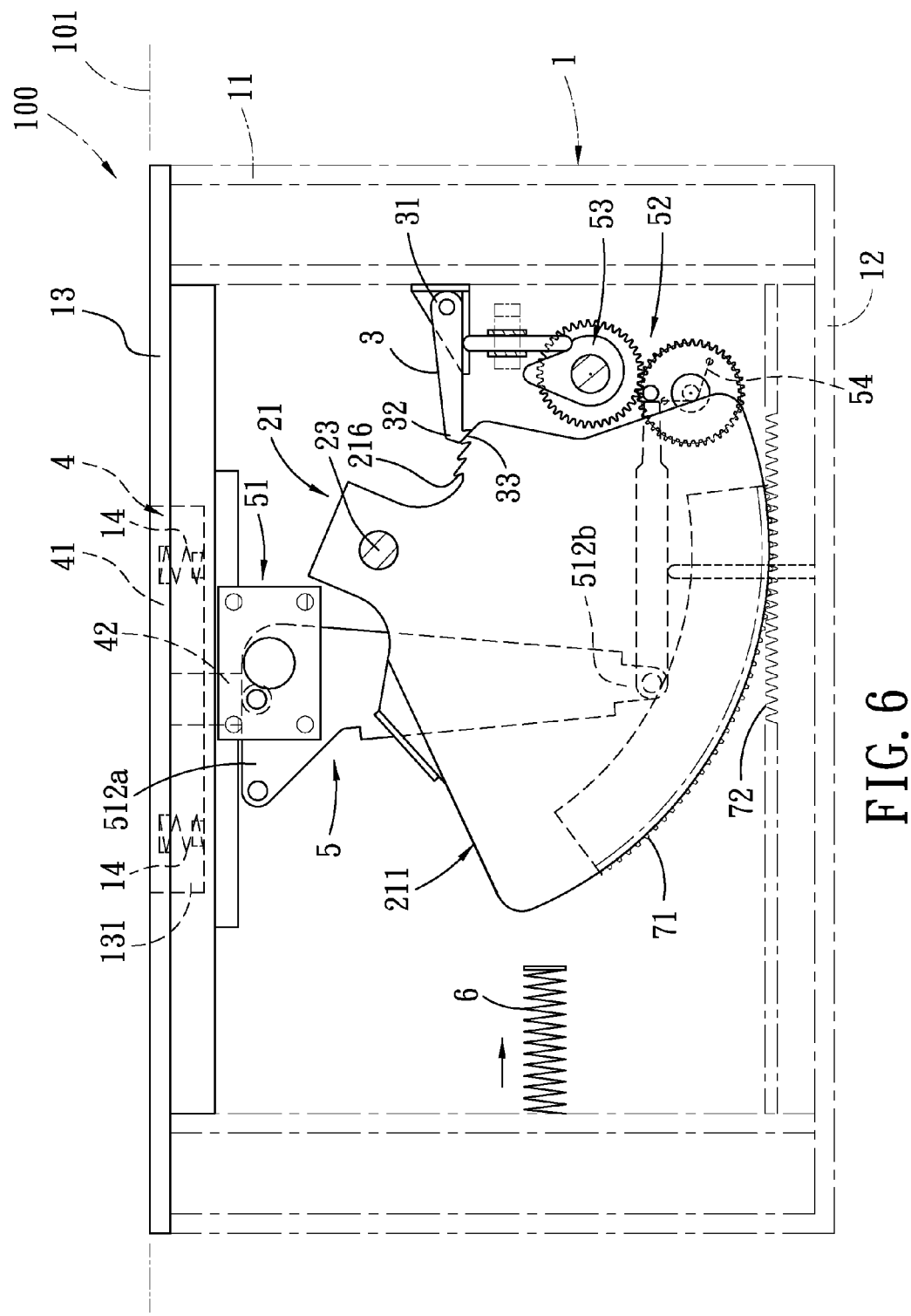

After the retaining end 32 has released the rear marginal zone (211d), the unbalanced mass unit 21 commences rocking and moves toward the biasing member 6. referring to FIGS. 5 and 6, upon reaching the front unbalanced position, the lower segment 211 is pushed by the biasing member 6 back toward the releasably retaining member 3 so as to continuously angularly move along the wobbling path in the forward and rearward direction (X).

Further, the gear assembly 52 includes a coil spring 54 which is disposed on the first gear 521 or the second gear 522 and which has a biasing force to counteract the rearward stroke of the second link member 513. Thus, upon cessation of the rearward stroke, i.e., removal of the downward mechanical load on the triggering member 4, the coil spring 54 can bias the transmitting shaft 530 to rotate in the clockwise direction so as to bring the cam surface 531 back to the non-actuating position as shown in FIG. 3. At this stage, the retaining end 32 can be turned back to be ready for retaining the rear marginal zone (211d) by virtue of the slope guide 33.

Further, a guiding mechanism 7 includes a plurality of teeth 71 disposed on the rounded bottom surface 214 of at least one of the rocking plates 212, and a linearly extending rack 72 disposed on the lower wall 12 to define the wobbling path. The linearly extending rack 72 is matingly engageable with the teeth 71 so as to guide the lower segment 211 to angularly move along the wobbling path.

Alternatively, the force transmitting mechanism 5 may, instead of being the first and second link members 512, 513, include a rack (not shown) which is matingly engaged with the first gear 521. The cam member 53 maybe configured to directly push the releasably retaining member 3 without the provision of the actuating shaft 514. Alternatively, the linkage 51 is configured to be directly coupled with and to drive the releasably retaining member 3 without the provision of the gear assembly 52 and the cam member 53. Moreover, the wobbling module 2, the releasably retaining member 3, the triggering members 4, the force transmitting mechanisms 5, and the biasing member 6 may be mounted within a concavity under the road surface 101 without the provision of the frame 1.

It is noted that, in this embodiment, the two triggering members 4 are located in correspondence with left and right wheels of a vehicle so as to be triggered at the same time.

Figure 7:
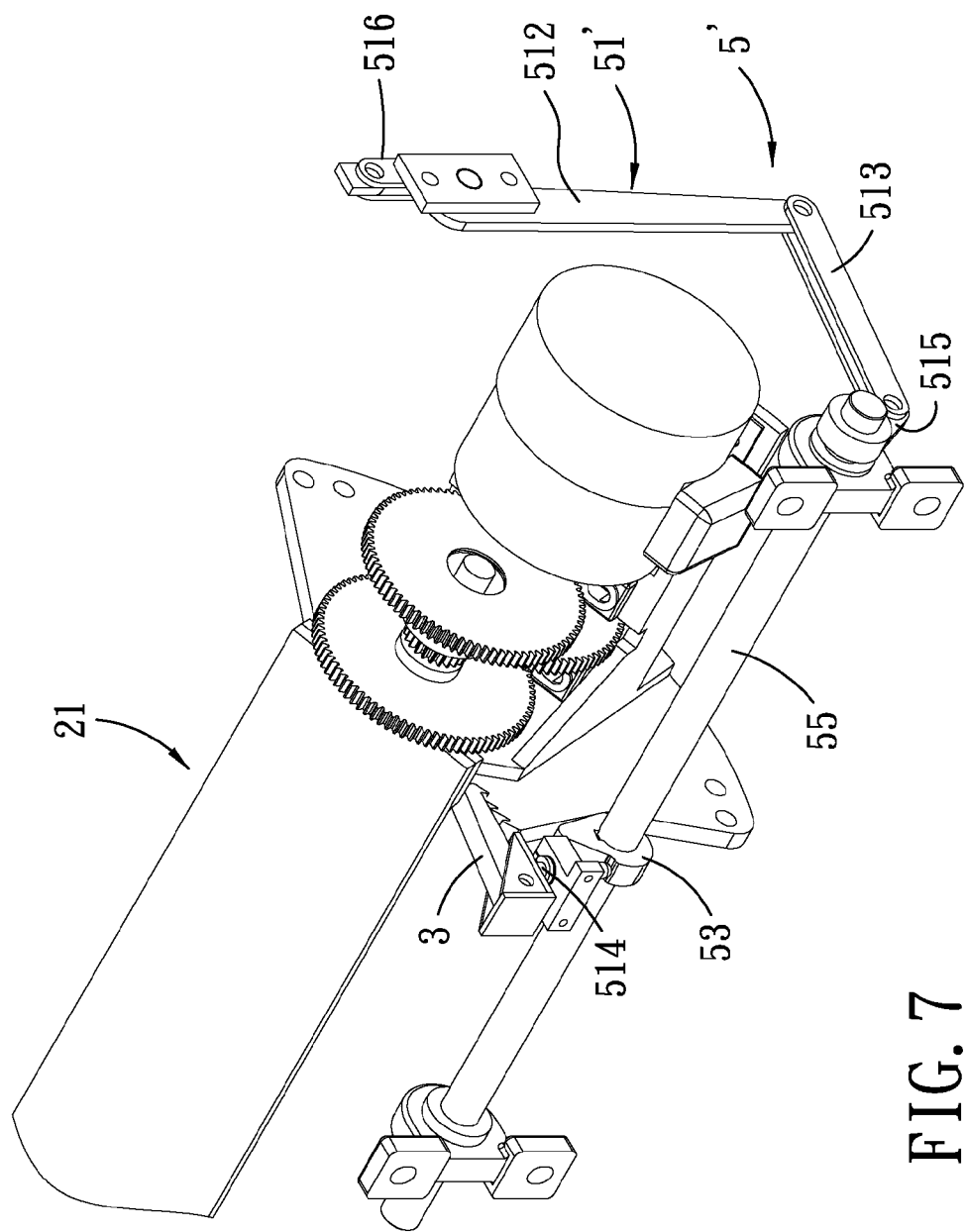
FIG. 7 is a perspective view of a force transmitting mechanism.
Figure 8:
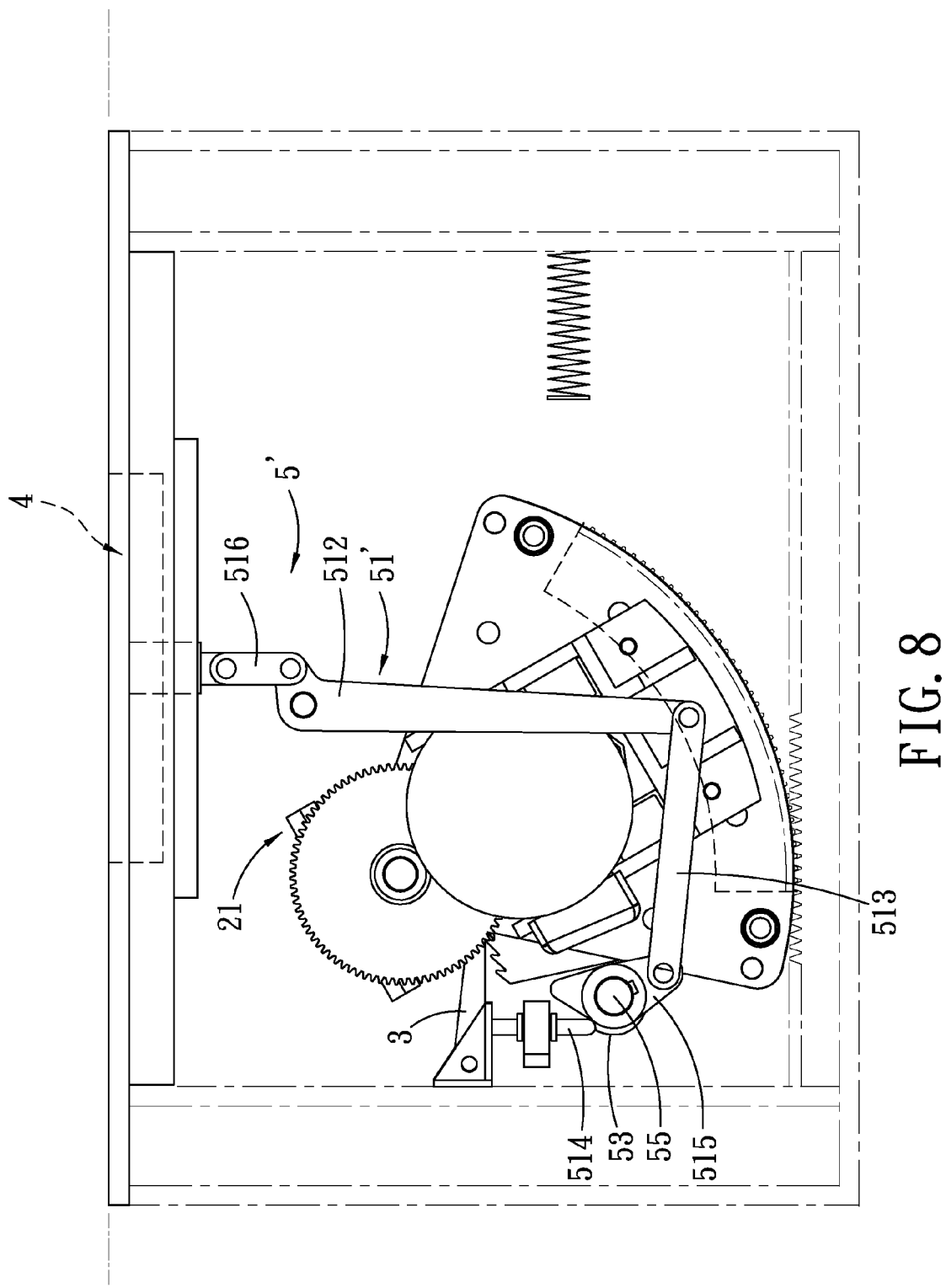
FIG. 8 is a schematic view showing the structural relationship between the force transmitting mechanism in FIG. 7 and the unbalanced mass unit.

FIGS. 7 and 8 illustrate the force transmitting mechanism 5' in another form. The linkage 51' of this force transmitting mechanism 5' further includes a third link member 515 coupling the second link member 513 with the transmitting shaft 55, and a fourth link member 516 coupling the first link member 512 and the respective triggering member 4. Hence, the above-described gear assembly 52 can be dispensed with.

As illustrated, by virtue of the unbalanced mass unit 21, the weighting members 24 and the coupling shaft 23, when a vehicle runs over the triggering members 4, through the wobbling movement of the unbalanced mass unit 21, the weighting members 24 can swing to rotate the coupling shaft 23 such that the rotational torques of the coupling shaft 23 can be converted into electrical energy by the electricity generators 22.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. An apparatus for generating electrical energy, comprising:
    an unbalanced mass unit which is disposed to be rockable along a wobbling path that extends in a forward and rearward direction, and which includes an upper segment having a rocking region, and a lower segment disposed opposite to said upper segment in an upright direction, said lower segment having a juncture region which is proximate to said upper segment, and which extends in the forward and rearward direction to terminate at front and rear marginal zones, and a center-of-mass region which is distal from said upper segment, and which defines the center of mass of said unbalanced mass unit, said center-of-mass region being configured such that said lower segment is angularly movable along the wobbling path between front and rear unbalanced positions which are opposite to each other in the forward and rearward direction, and where said front and rear marginal zones respectively reach highest front and rear points due to the moment of inertia, and such that said rocking region makes a forward rocking movement from the front unbalanced position to the rear unbalanced position, and a rearward rocking movement from the rear unbalanced position to the front unbalanced position;
    a coupling shaft which extends along a rotary axis in a longitudinal direction that is transverse to the forward and rearward direction, and which is coupled to said rocking region;
    a weighting unit which is connected to said coupling shaft and which is swung in response to at least one of the forward and rearward rocking movements of said rocking region to permit said coupling shaft to make a rotational movement about the rotary axis;
    an electricity generator which is disposed to be movable with said unbalanced mass unit, and which is coupled with said coupling shaft to convert the rotational movement into electrical energy;
    a releasably retaining member which is disposed in proximity to one of the front and rear unbalanced positions, and which has a retaining end configured such that, when said lower segment reaches said one of the front and rear unbalanced positions, said retaining end is releasably snapped on one of said front and rear marginal zones so as to retain said lower segment at a corresponding one of the front and rear unbalanced positions;
    a triggering member disposed to be actuated, in response to a downward mechanical load, to make a stroke of downward movement; and
    a force transmitting mechanism disposed to couple said releasably retaining member with said triggering member such that, in response to the stroke of downward movement of said triggering member, said retaining end is actuated to release a corresponding one of said front and rear marginal zones so as to permit said lower segment to commence angular movement along the wobbling path.

2. The apparatus as claimed in claim 1, further comprising a biasing member disposed in proximity of the other one of the front and rear unbalanced positions, and configured such that, when said lower segment reaches the other one of the front and rear unbalanced positions, said biasing member pushes the other one of said front and rear marginal zones back so as to move said lower segment toward said releasably retaining member.

3. The apparatus as claimed in claim 2, wherein said force transmitting mechanism includes a cam member having a cam surface which is turnable about a cam axis in the longitudinal direction and which is coupled with said releasably retaining member, a transmitting shaft disposed to turn said cam member, and a linkage coupling said triggering member with said transmitting shaft to transmit the stroke of downward movement of said triggering member to rotate said transmitting shaft so as to turn said cam surface from a non-actuating position to an actuating position, where said releasably retaining member is actuated to release the corresponding one of said front and rear marginal zones.

4. The apparatus as claimed in claim 3, wherein said linkage includes a first link member pivotally mounted about a link axis parallel to the cam axis and having a power end which is actuated by the stroke of downward movement of said triggering member, and a weight end which is angularly displaced from said power end about the link axis so as to convert the stroke of downward movement to a rearward stroke, and a second link member having a linked end which is linked with said weight end, and an actuating end which is coupled to said transmitting shaft so as to permit said transmitting shaft to be driven by the rearward stroke to rotate about said cam axis.

5. The apparatus as claimed in claim 4, wherein said force transmitting mechanism has a gear assembly which includes a first gear that is coupled with said actuating end of said second link member so as to be driven by the rearward stroke to rotate in a clockwise direction, and a second gear that is meshed with said first gear, and that is coaxially mounted with said transmitting shaft so as to be rotated about the cam axis in a counterclockwise direction.

6. The apparatus as claimed in claim 5, wherein said gear assembly further includes a coil spring which is disposed on said first gear and which has a biasing force to counteract the rearward stroke such that, upon cessation of the rearward stroke, said coil spring is permitted to bias said transmitting shaft to rotate in the clockwise direction so as to bring said cam surface back to the non-actuating position.

7. The apparatus as claimed in claim 3, wherein said releasably retaining member has a pivot end pivotally mounted about a pivot axis parallel to the cam axis, and an actuated region interposed between said retaining and pivot ends, said force transmitting mechanism having an actuating shaft which is engaged with said actuated region and which is disposed to be actuated by said cam surface to turn said actuated region about the pivot axis so as to permit said retaining end to disengage from the corresponding one of said front and rear marginal zones when said cam surface is displaced from the non-actuating position to the actuating position.

8. The apparatus as claimed in claim 7, wherein said cam member has a pressing region which is angularly displaced from said cam surface and which is configured to press the corresponding one of said front and rear marginal zones toward said biasing member when said cam surface is in the actuating position.

9. The apparatus as claimed in claim 2, further comprising a frame including upper and lower walls spaced apart from each other in the upright direction, and a surrounding wall extending between said upper and lower walls and cooperating therewith to define an accommodation space for accommodating said unbalanced mass unit, said triggering member being in form of a spring-loaded platform which is movably disposed in said upper wall, said releasably retaining member and said biasing member being disposed on said surrounding wall.

10. The apparatus as claimed in claim 9, wherein said center-of-mass region has a rounded bottom surface angularly extending about the rotary axis, said apparatus further comprising a guiding mechanism which includes a plurality of teeth that are disposed on said rounded bottom surface, and a linearly extending rack that is disposed on said lower wall and that defines the wobbling path, said linearly extending rack being matingly engageable with said teeth so as to guide said lower segment to angularly move along the wobbling path.

\* \* \* \* \*